Aug. 27, 1963  P. C. MILLER  3,101,801
MATERIALS PROPORTIONING DEVICE
Filed Jan. 11, 1960  4 Sheets-Sheet 1

INVENTOR
PAUL C. MILLER

BY

ATTORNEYS

Aug. 27, 1963

P. C. MILLER 3,101,801

MATERIALS PROPORTIONING DEVICE

Filed Jan. 11, 1960

INVENTOR
PAUL C. MILLER

BY *Price and Heneveld*

ATTORNEYS

Aug. 27, 1963  P. C. MILLER  3,101,801
MATERIALS PROPORTIONING DEVICE
Filed Jan. 11, 1960  4 Sheets-Sheet 3

Fig. 7

INVENTOR
PAUL C. MILLER
BY
ATTORNEYS

Aug. 27, 1963 P. C. MILLER 3,101,801
MATERIALS PROPORTIONING DEVICE
Filed Jan. 11, 1960 4 Sheets-Sheet 4

INVENTOR
PAUL C. MILLER

BY
ATTORNEYS

United States Patent Office 3,101,801
Patented Aug. 27, 1963

3,101,801
MATERIALS PROPORTIONING DEVICE
Paul C. Miller, 10300 Sparta Ave., Sparta, Mich.
Filed Jan. 11, 1960, Ser. No. 1,742
13 Claims. (Cl. 177—70)

The invention concerns devices for proportioning materials in given amounts, and more particularly devices in which accurate control of the quantities of individual components is assured, provisions are made for initiating remedial action if either an excess or an insufficient amount of a given component is dispensed, and the components may be mixed for a controlled length of time.

Devices for the automatic mixing of materials consisting of several ingredients are well known, and a representative such device is disclosed in U.S. Patent No. 2,625,301 to W. E. Saxe, issued January 13, 1953. The previously known devices, however, worked on a principle of adding incremental weights of ingredients in a predetermined sequence, shutting off the dispensing apparatus when the total weight of the mixture reached a predetermined limit associated with the completion of the mixture up to and including the ingredient dispensed. It was therefore possible with this type of device to accidentally add too much of one ingredient in situations where, for example, the dispensing gate closed a fraction of a second too late, and hence to add too little of the next following ingredient. Another disadvantage of previously known devices is their delicacy, which prevents their use in mobile applications.

This invention overcomes these difficulties by providing a mechanism which not only controls the dispensing of individual ingredients of the mixture by weight, but also checks after the addition of each ingredient whether or not the total weight of the mixture up to that point is within predetermined limits, and stops the machinery if the mixture at the moment of checking is either underweight or overweight. In addition, the present invention includes means compensating for the weight of material traveling between the dispensing control valve or mechanism and the mixture container at the time the dispensing control is shut off. The structure provided by this invention also does not require any vacuum tubes or delicate electronic or mechanical parts and is therefore suitable for use in mobile plants such as are frequently used by contractors.

It is therefore the object of this invention to provide a materials proportioning device which automatically adds predetermined amounts of ingredients to a mixture and checks the accuracy of the amount added after each individual dispensing operation.

It is a further object of this invention to provide a proportioning apparatus which takes into account the weight of material traveling through the dispensing mechanism at the moment of termination of the dispensing operation and initiates remedial action if the amount of materal so traveling is more or less than a predetermined amount.

It is a still further object of this invention to provide an apparatus which automatically halts the proportioning and mixing operation if the quantity of any one ingredient introduced into the mixture is more or less than a predetermined amount.

These and other advantages of the present invention will be apparent from a perusal of the following description taken in connection with the accompanying drawings in which.

Basically, the invention consists of mechanism for dispensing quantities of ingredients successively from a plurality of materials sources such as storage containers or bins into a mixing container or hopper while continuously weighing the total amount of material in the mixing container. The amounts of ingredients discharged into the mixing container are controlled by control circuits operated by sensing means such as photocells or magnetic switches associated with the weighing mechanism. Following the completion of the introduction of each ingredient, and after the weighing mechanism has had time to come to rest, an electrical checking circuit checks the total weight of the mixing container and ascertains whether or not it is within predetermined upper and lower limits. If the checking circuit finds the weight to be accurate, it releases the mechanism through the action of a control or clearance element for the introduction of the next ingredient; but if it finds an error in the total weight of the mixing container, it operates an actuating element to shut off the machinery pending correction of the error by the operator.

In accordance with a second aspect of the invention, the sensing means which determine the correctness of the weight are movably mounted between two positions. In the first position, they sense the weight which, when supplemented by the lead weight, i.e. the weight of material which is in the dispensing mechanism or delivery chute at the time the supply of ingredient is shut off, will result in the correct final weight. In this position, the sensing means when energized close the ingredient supply mechanism and at the same time move themselves to the second position. In this second position, the sensing device is set for the correct total weight which should be in the mixing container when the dispensing operation of the ingredient associated with that sensing means is completely terminated. It is in the second position that the check of accuracy of total weight is performed by the checking circuit.

Figures 1, 2, 10, 11:
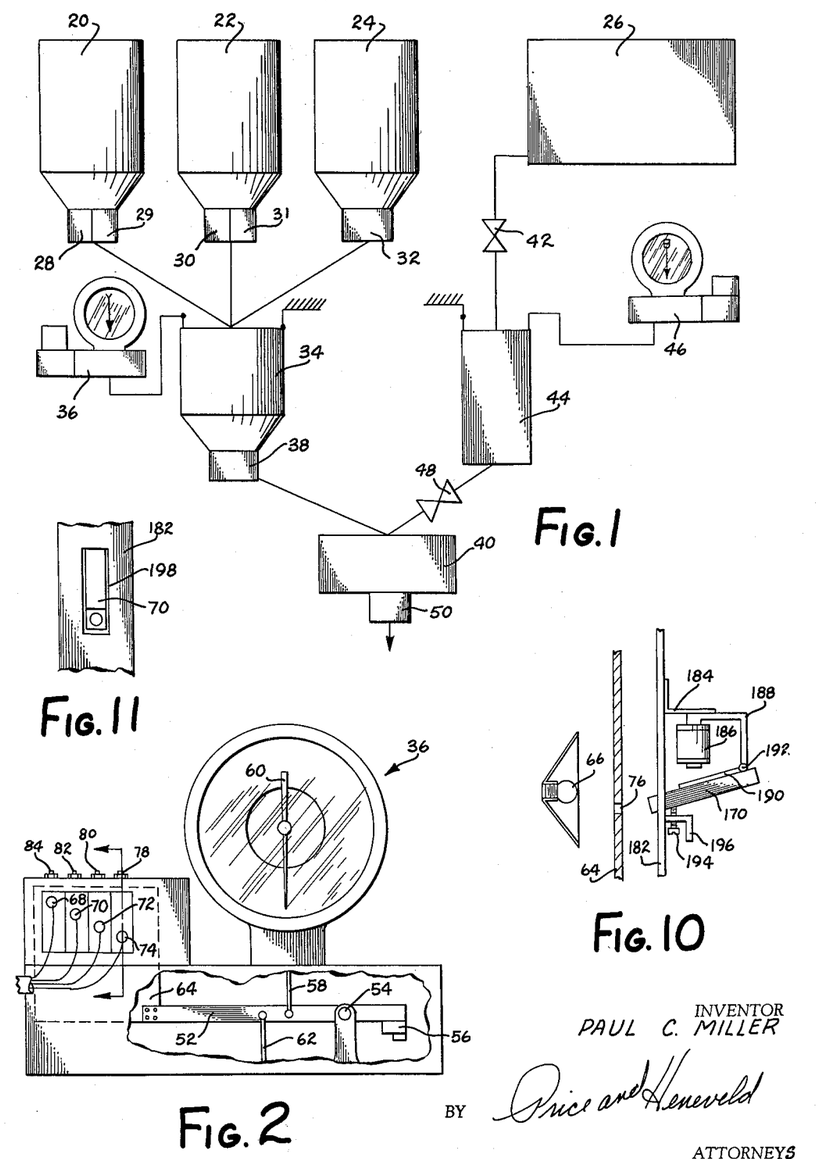
FIGURE 1 is a schematic diagram of an illustrative installation using the mechanism of this invention.
FIGURE 2 is a partially cutaway elevation of one type of scale used with the device of this invention.
FIGURE 10 is a side elevation of a movable light sensitive device used in connection with the structure of FIGURES 3 and 4 according to one aspect of the invention.
FIGURE 11 is a front elevation of the device of FIGURE 10.

Referring now to the drawings, FIGURE 1 shows schematically one of many possible arrangements of proportioning device, in this instance an asphalt mixing plant, which may use the circuitry of this invention. In the asphalt plant shown in FIGURE 1, bins 20, 22 and 24 may contain stone, sand, and fly ash respectively. Tank 26 contains asphalt. The materials contained in the bins 20, 22 and 24 are dispensed or discharged through power-operated gates 28 through 32. Gates 29 and 31 may deliver the same materials as gates 28 and 30, respectively, but may do so at a slower rate to permit more accurate delivery when the two-position or lead feature of the sensing means is not used. Additional bins and gates may of course be used when a greater number of materials is required. The fly ash gate 32 may consist, for example, of an auger. From the gates 28, 30 and 32, the solid materials of the mixture, collectively termed the aggregate, are conveyed into an aggregate hopper 34. The aggregate hopper 34 is connected in any well-known manner to the aggregate scale 36 so that the contents of the aggregate hopper 34 are continuously being weighed. The aggregate hopper 34 is in turn discharged through gate 38 into the pug mill 40. In a similar manner, asphalt from a tank 26 is dispensed by valve 42 into an asphalt weighing tank or bucket 44 connected in any well-known manner to the asphalt scale 46. From the asphalt bucket 44, the asphalt is delivered to the pug mill 40 by delivery valve 48. In the pug mill 40, the aggregate is first thoroughly dry-mixed and then wet-mixed with the asphalt into a product ready for use in highway construction or the like, the dry and wet mix times being accurately controlled by the unit. The contents of the pug mill 40, when thoroughly mixed, may be dumped into an appropriate vehicle such as a truck (not shown) by the opening of dumping gate 50.

Figure 3:
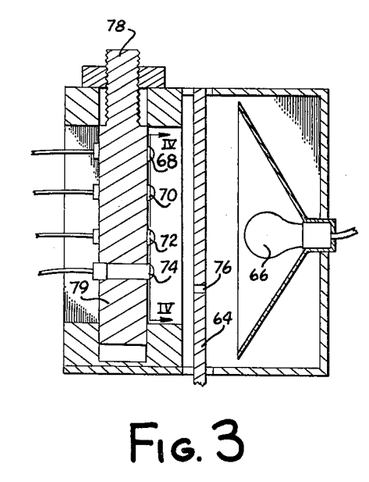
FIGURE 3 is a vertical section along the section line of FIGURE 2.
Figure 4:
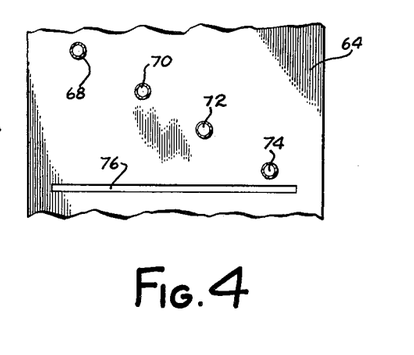
FIGURE 4 is a vertical section along lines IV—IV of FIGURE 3.

Turning now to FIGURES 2, 3 and 4, the aggregate scale 36 will be seen to consist of a scale beam 52 pivoted on a fulcrum 54 and weighted at one of its ends with a fixed counterweight 56. An indicator linkage 58 is provided on the side of the fulcrum opposite that containing counterweight 56 for actuating the pointer 60 of the scale 36. The scale is operated by hopper linkage 62 which is attached to the hopper 34 and pulls the scale beam in a counterclockwise direction about fulcrum 54 against the effect of counterweight 56. A masking plate 64 is mounted on the end of scale beam 52 as shown in FIGURE 2 and is interposed between a light source shown schematically at 66 (FIGURE 3) and a plurality of light sensitive devices 68 through 74 and contains a slot 76 (FIGURE 4) so positioned as to allow the light from the light source 66 to fall successively on the photocells 68 through 74 as the scale moves through its range of indications. Threaded adjustment means 78 through 84 permit adjustment, as to each individual light sensitive device, of the weight at which the light from the light source 66 will strike the light sensitive device involved through the slot 76, for a purpose hereinafter described.

Figure 9:
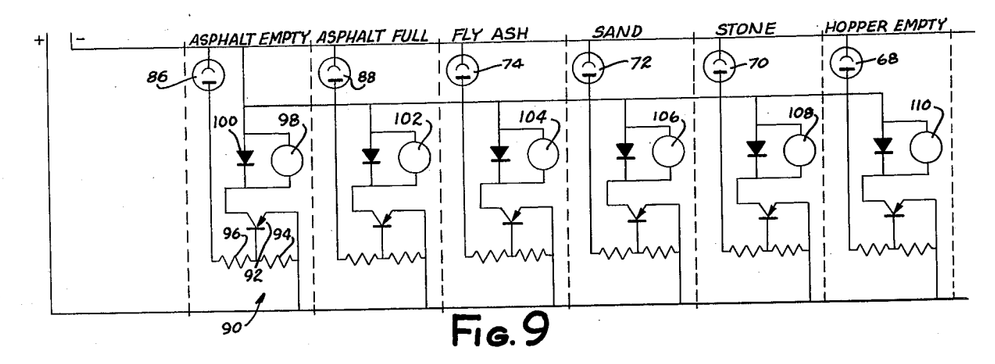
FIGURE 9 is a diagram of the electrical circuits associated with the light sensitive sensing arrangement of FIGURES 3 and 4.

The asphalt scale 46 is constructed exactly like the aggregate scale 36, except that only two light-sensitive devices 86 and 88 are provided. FIGURE 9 shows the electrical connections for the light-sensitive devices 68 through 74 and 86, 88. Each of the light-sensitive devices is connected into a control circuit 90 designed to operate a relay through the intermediary of a transistor. Since all of the control circuits are alike, only the circuit associated with light-sensitive device 86 will be described herein. The control circuit 90 consists of a transistor 92 whose base is connected to the positive side of a D.C. supply through resistor 94. At the same time, the base of the transistor 92 is connected to the negative side of the D.C. supply through a resistor 96 in series with the light-sensitive device 86. It will be readily seen that as long as the light-sensitive device is dark, it presents an almost infinite resistance in the circuit between the base of transistor 92 and the negative side of the D.C. supply. In this condition, the potential at the base of transistor 92 will be that of the positive side of the D.C. supply. If, however, the light-sensitive device 86 is struck by light, it will start to conduct, and the potential of the base of transistor 92 will then be a value somewhere between the positive and negative potentials of the supply, the exact level depending on the relationship between resistors 94 and 96. The transistor parameters are so chosen that the transistor will be cut off when light-sensitive device 86 is not conducting, but will conduct when light-sensitive device 86 is struck by light. When the transistor 94 is in its conducting condition, current flows from the positive side of the supply through the emitter and collector and on through relay 98. Actuation of relay 98 by a reverse current flow is prevented by the diode 100 which by-passes any reverse current flow around the relay 98. Thus, it will be seen that illumination of light-sensitive device 86 energizes relay 98. In a similar manner, illumination of light-sensitive devices 88, 74, 72, 70 and 68 causes energization of relays 102, 104, 106, 108 and 110 respectively. Each of the relays 98 and 102 through 110 has one pair of normally open contacts, which will be hereinafter identified by the number of the relay with which they are associated, followed by the letter "A," such as, for example, 98–A. In addition, relays 102, 106, and 108 also have a second pair of normally open contacts identified by the letter "B," such as, for example, 102–B.

Figure 7:
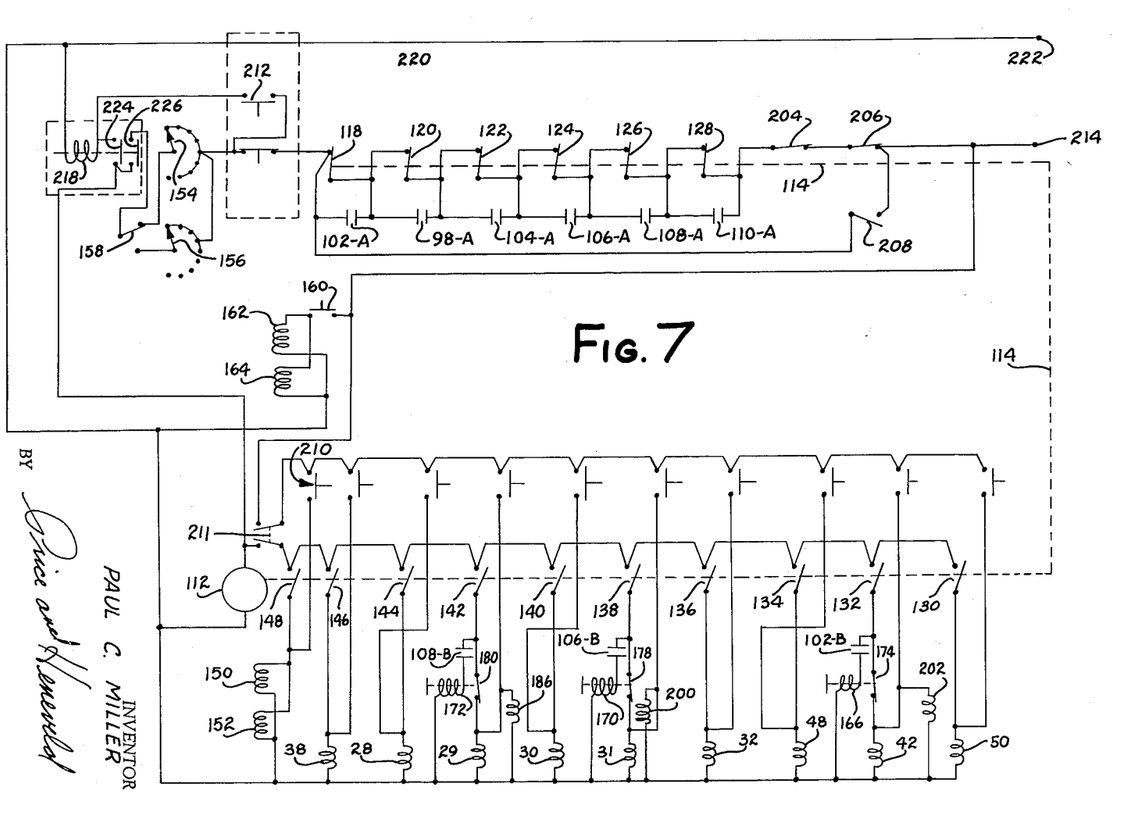
FIGURE 7 is the electrical diagram of the main operating circuits of the device.
Figure 8:
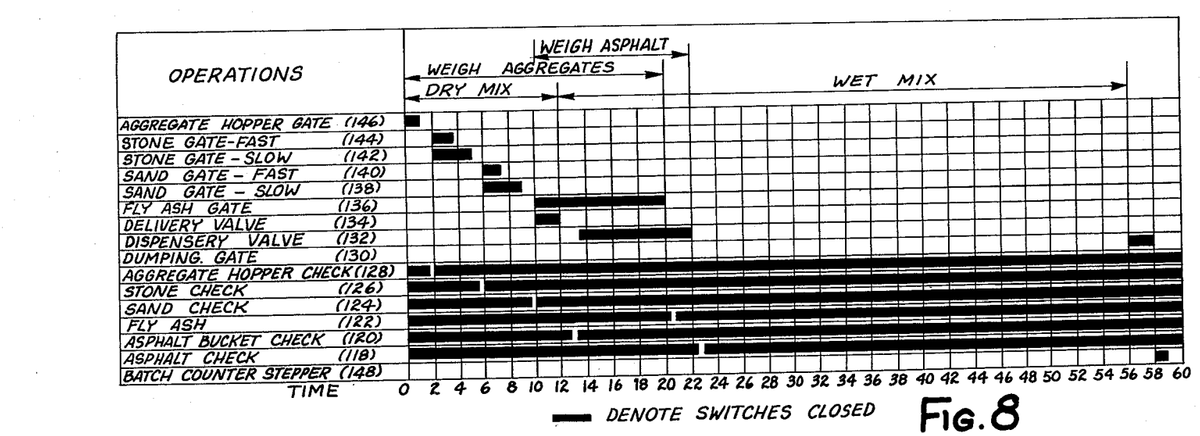
FIGURE 8 is a graphical representation, in terms of switching operation versus time, of the switching sequence accomplished by the timing mechanism of the timer motor.

The various operations of the mechanism of this invention are basically controlled by the timing mechanism schematically shown in FIGURE 8. A timer motor 112 (FIGURE 7) drives a cam shaft 114, best indicated schematically in FIGURE 7 by a dotted line, at a speed of e.g. 1 revolution per minute. The cam shaft 114 carries a plurality of cams which close a series of microswitches 118 through 148 in a well-known manner at various times during the one minute cycle of the apparatus, in the sequence shown in FIGURE 8.

In FIGURE 8, the black areas indicate the times during which the individual switches 118 through 148 are closed. It will be understood that the times indicated in FIGURE 8 are arbitrary and illustrative only, and may be varied as a particular installation may require. More particularly, in the example given, the aggregate gate switch 146 is closed during the first second of each cycle so as to discharge the aggregate from the hopper into the pug mill. The next half-second allows the scale to come to rest after the discharge of the aggregate, and during the next following half-second, check switch 128 opens momentarily to stop the machine if the hopper has not been completely emptied (i.e. if light-sensitive device 68 is not illuminated, and hence by-pass contacts 110–A are not closed). The fast delivery stone gate switch 144 then closes and remains closed for one and one-half seconds. The slow delivery stone gate enabling switch 142 closes at the same time as switch 144 but remains open for three seconds. After the re-opening of switch 142, one-half second is allowed for the scale to come to rest, and in the next half-second, stone check switch 126 opens momentarily to stop the machine if the hopper weight at this point is incorrect.

After the stone delivery and check, the other materials are dispensed and weighed in a like manner. It will be noted that the dispensing and weighing of one batch of materials takes place while the preceding batch of materials is being mixed, a feature which saves a considerable amount of working time each day.

The switches 132, 138, and 142 are referred to as enabling switches because the dispensing devices associated therewith are ultimately controlled by control relays, 102, 106, and 108, respectively. Each of the check switches 118 through 128 are closed through the entire cycle of the device with the exception of a momentary open period as shown in FIGURE 8, whose position in the cycle is determined by the function of the particular switch as hereinafter explained. The batch counter advancing switch 148 is closed momentarily at the end of each cycle after the pug mill has been dumped. This energizes the stepping coils 150, 152 of the batch counters 154, 156, which advances the switch arms of counters 154, 156 by one step in the clockwise direction. The purpose of the batch counters 154, 156 is to count the batches delivered from the pug mill into the truck and to stop the apparatus when a predetermined number of batches have been delivered into the truck, according to the truck's capacity. In normal operation, it is generally sufficient to provide an eight-batch counter 154 and a five-batch counter 156. The appropriate batch counter can be selected by the batch counter selector switch 158. The batch counters 154, 156 can be reset to their extreme counter-clockwise position by pushing the batch counter reset button 160 which momentarily energizes the batch counter reset coils 162, 164. It will be understood that instead of using step switches as shown in the drawing, any other type of batch counter may be used, such as, for example, a counter of the type which can be manually set each time the machine is started to count out any desired number of batches from one to ten or any other maximum number, depending on the counter used.

Referring back to FIGURE 7 now, it will be observed that each of the normally open contacts 102-B, 106-B, and 108-B is so arranged as to energize the coil of a time delay relay 166, 170, and 172, respectively, which is so arranged as to open cut-off switches 174, 178, or 180 associated therewith immediately upon closing of relay contacts 102-B, 106-B, or 108-B, but to delay the reclosing of cut-off switches 174, 178, or 180 for a predetermined time after the relay contacts 102-B, 106-B, or 108-B have opened again. This arrangement is useful in connection with the device shown in FIGURE 10 which can be used interchangeably with any of the light-sensitive device supporting means 79 in FIGURE 2. In FIGURE 10, the masking plate 64 is again shown in front of the light source 66 from which light is transmitted through the slot 76 in the masking plate 64. A light-sensitive device such as 70 is mounted on a supporting plate 182 in such a manner that it can be electromagnetically moved between an upper and lower position. More specifically, a bracket 184 attached to the supporting plate 182 supports an electromagnet 186 by its armature 188. One leg of the armature 188 is formed as an arm 190 pivotally attached to the armature 188 by a pin 192. The arm 190 in turn carries the light-sensitive device 70. When the electromagnet 186 is de-energized, the arm 190 pivots about pin 192 in a counterclockwise direction under the influence of the weight of light-sensitive device 70. Light-sensitive device 70 is thereby moved into a lower position which can be adjusted by a setscrew 194 mounted in the flange 196 of supporting plate 182. When the electromagnet 186 is energized, it pulls arm 190 toward it, thus moving light-sensitive device 70 into its upper position which is reached when arm 190 and the end of armature 188 protruding below electromagnet 186 come into contact with each other. A slot 198 (FIGURE 11) in supporting plate 182 guides light-sensitive device 70 in its up-and-down movement. The supporting plate 182 in turn may be moved up and down as necessary to adjust the light-sensitive device for response at the desired weight by an adjusting mechanism (not shown) similar to 78 in FIGURE 3. Thus, the device of FIGURES 10 and 11 enables the light-sensitive devices to be moved electromagnetically between two predeterminable positions corresponding to slightly different weights, for a purpose hereinafter described. Although the device of FIGURE 10 has been described in connection with electromagnet 186 and light-sensitive device 70, which is associated with the stone gate circuit, it will be understood that like mechanism may be provided for the sand gate light-sensitive device 72 and the asphalt light-sensitive device 88 in association with electromagnets 200 and 202 (FIGURE 7), respectively, or for any other light-sensitive device used in the machine.

Safety switches 204 and 206 are provided to stop the machine if the sand or stone level, respectively, drop below a predetermined level in the storage bins 20 and 22. A checking circuit by-pass switch 208 is provided for operating the timing mechanism manually, and push-button switches 210 permit the individual manual operation of each gate and valve, as well as of the batch counters. Appropriate switch means such as 211 may be provided to disable the automatic gate controls when manual control is used, and vice versa.

*Operation*

In a typical use of the described embodiment of the device of this invention, it might be desired for example to load into a truck eight batches of ready-mixed road surfacing compound, each batch containing one thousand pounds of stone, one thousand pounds of sand, two hundred pounds of fly ash, and one thousand pounds of asphalt. As the machine starts its cycle, the aggregate hopper 34 already contains one batch of aggregate consisting of twenty-two hundred pounds of dry ingredients, and the asphalt bucket 44 contains one full load consisting of one thousand pounds of asphalt. The pug mill 40 is empty. At this time, all the electrical circuit elements are in the position shown in FIGURE 7. In order to start the mechanism, the normally open start button 212 is pressed momentarily. This establishes an electrical circuit from one side 214 of the A.C. line through closed switches 206, 204, 128, 126, 124, 122, 120, 118, the normally closed stop switch 216, start switch 212, motor relay 218, and neutral wire 220 back to the other side 222 of the A.C. power line. The energization of motor relay 218 causes it to close its contacts 224, 226, whereby contact 226 establishes a circuit path from the stop button 216 through batch counter 154 and batch counter selector switch 158 to the timer motor 112. The closing of contact 224 establishes a circuit from contact 226 back to the coil of relay 218 and thus locks relay 218 in the energized position even after the start button 212 is released. Motor 112 is now energized, and the first switch to close will be switch 146. This causes the aggregate hopper gate 38 to be actuated, dumping the contents of the aggregate hopper 34 into the pug mill 40. The aggregate is now stirred in the pug mill 40 for about twelve seconds in the embodiment described herein, this being the time interval designated as "dry mix" in the diagram of FIGURE 8. As soon as the aggregate has been dumped out of aggregate hopper 34, the aggregate check switch 128 opens momentarily. If all the aggregate has been properly dumped out of the hopper and into the pug mill, the hopper will at this moment be empty so that aggregate scale 36 will read zero. In this position of the scale 36, slot 76 in masking plate 64 will be in line with light-sensitive device 68. Since light-sensitive device 68 is thereby illuminated, relay 110 will be energized and the normally open contacts 110-A or relay 110 be closed thereby. Thus, the opening of switch 128 has no effect on the electrical circuit, the switch 128 at that moment being short-circuited through relay contacts 110-A. When the timing device recloses switch 128, it also opens switch 146 and closes the stone gate switches 144 and 142. This causes stone to be discharged from the stone bin 20 into the aggregate hopper 34. When the major portion of the desired throusand pounds of stone (in our example, has been discharged into the aggregate hopper 34, the timing mechanism opens the fast stone discharge switch 144 but leaves the slow stone discharge gate switch 142 closed. This stone therefore continues to fall slowly through gate 29 into the aggregate hopper 34 until the total weight of material in the aggregate hopper reaches one thousand pounds. At this point, the slot 76 in masking plate 64 reaches the level of light-sensitive device 70. The resulting illumination of light-sensitive device 70 causes relay 108 to become energized, which in turn causes the contacts 108-A and 108-B to close simultaneously. The closing of contacts 108-B has no significance at this point, as the stone check switch 126 is still closed. However, the closing of contacts 108-B energizes the time delay relay 172 which immediately causes switch 180 to move from the position in which it is shown in FIGURE 7 to its other position. This causes the circuit of gate 29 to be broken so that the flow of stone is shut off.

At this point, the timing mechanism opens the stone check switch 126. If the correct weight of stone has been delivered into the aggregate hopper so that light-sensitive device 70 is illuminated, the stone check switch 126 will be by-passed by relay contacts 108–A, so that the opening of switch 126 will have no effect on the circuit. The timing mechanism now closes switch 126 and opens switch 142. Immediately thereafter, the timing mechanism opens the sand gates 30 and 31 by closing switches 140 and 138. In the same manner as in the above described operation, sand is first discharged at a fast rate through the gate 30 for a sufficient length of time to supply the major part of the sand weight desired. The timer then shuts gate 30 but leaves gate 31 open to continue the relatively slow delivery of sand until the scale reaches the two thousand pound mark, thus bringing slot 76 in front of light-sensitive device 72. In like manner as previously described with respect to the stone, the illumination of light-sensitive device 72 stops delivery of the sand.

The timer now checks whether the total weight in the hopper is accurate up to this point by opening sand check switch 124. If the total weight of the ingredients in the hopper up to this point is exactly two thousand pounds, the switch 124 will at that moment be short-circuited through the closed contacts 106–A. The circuit now recloses switch 124, opens sand gate switch 138, and closes fly ash switch 136. Inasmuch as fly ash is generally delivered by an auger mechanism whose rate of delivery can be precisely determine by adjusting the speed of the auger and the length of time it operates, it is not necessary to control the fly ash gate 32 by a photocell device. As soon as the delivery of the fly ash is completed, the timer opens fly ash check switch 122 to assure that the total weight in the hopper has now reached twenty-two hundred pounds, at which point light-sensitive device 74 is illuminated, thus closing contacts 104–A and rendering the opening of switch 122 ineffective. At about the tenth second of the cycle in the example described, i.e. about ten seconds after the aggregate in hopper 34 has been dumped into pug mill 40, the timer also closed switch 134 to energize the delivery valve 48 which dumps the contents of the asphalt bucket 44 into the pug mill 40. In the pug mill, the asphalt is then mixed with the already mixed dry ingredients during a phase of the operation which is designated as "wet mix" in the diagram of FIGURE 8. As soon as the asphalt has had time to be fully discharged through the delivery valve 48, and while delivery valve switch 134 is still closed, the timer opens switch 120. Switch 120 should, at that moment, be by-passed by the closing of contacts 98–A operated by relay 98, because relay 98 is energized when light-sensitive device 86 is illuminated as the asphalt scale 46 is in the zero position. As soon as this check has been completed, switch 120 recloses, switch 134 opens, and switch 132 closes, thus opening the dispensing valve to admit asphalt from the storage tank 26 into the asphalt bucket 44. Once again, as the asphalt scale reaches the thousand pound mark, light-sensitive device 88 becomes illuminated, relay 102 becomes energized, and contacts 102–A and 102–B close. The timer now checks the weight of asphalt in the bucket 44 by opening switch 118, which should be ineffective due to the closing of contacts 102–A. After reclosing asphalt check switch 118, the timer opens dispensing valve switch 132 and performs no further operations for substantially the second half of the timing cycle to permit the mixture in the pug mill 40 to be thoroughly mixed. As the timer approaches the end of its cycle, it closes dumping switch 130 which causes the pug mill dumping gate 50 to open so as to dump the finished batch of road surfacing material into the truck below. When this has been accomplished, the timer re-opens dumping switch 130 and momentarily closes the batch counter advancing switch 148. This causes a short current impulse to be delivered to the batch counter stepping coils 150, 152 so that the batch counters 154, 156 each move one step forward in a clockwise direction from the position shown in FIGURE 7.

For further accuracy, the light-sensitive devices 70, 72 and 88 may be mounted as described above with reference to FIG. 10. In this case, closing the circuit to the gate 29 would raise the light-sensitive device 70 to an upper position as the stone gate 29 is opened. The device 70 would then be set to first become illuminated when the weight in the aggregate hopper reaches almost, but not quite, one thousand pounds. When switch 180 in that case opens to close gate 29, it also de-energizes electro-magnet 186 associated with the light-sensitive device 70, thus moving the light-sensitive device 70 to its lower position and out of the range of the light beam projected through the slot 76. Relay 108 thereupon immediately drops out, opening the contacts 108–A and 108–B. Again, the opening of contacts 108–A is ineffective, as switch 126 is still closed. The opening of contacts 108–B is also ineffective because time delay relay 172 is so constructed that it will not return switch 180 to the position shown in FIGURE 7 until a predetermined time after the coil 172 has been de-energized. As the stone which was in the chute between bin 20 and aggregate hopper 34 at the time the gate 29 was closed falls into the aggregate hopper 34, the weight of the hopper will increase until it reaches the full thousand pounds desired. This extra weight will have caused the masking plate 64 to move downwardly a little so that slot 76 will now be in line with light-sensitive device 70 in the lower position of light-sensitive device 70. Therefore, the light-sensitive device 70 once again becomes illuminated, relay 108 becomes energized, and contacts 108–A and 108–B close once again.

Similarly, the light-sensitive device 72 would be set to be first energized just short of the two thousand pound mark, and magnet 200 is then cut off to stop delivery of the sand and simultaneously drop light-sensitive device 72 into its lower position. When all the sand has dropped out of the chute into hopper 34, the exact two thousand pound aggregate weight has been reached and the light-sensitive device 72 once again becomes illuminated.

With the light-sensitive device 88 mounted as shown in FIG. 10, as the asphalt scale nears the thousand pound mark, light-sensitive device 88 becomes illuminated, relay 102 becomes energized, and contacts 102–A and 102–B close. Delay relay 166 thereupon becomes energized, electromagnet 202 drops light-sensitive device 88 into its lower position, and relay 102 becomes temporarily de-energized until the discharge of the asphalt remaining in the pipes beyond the dispensing valve brings the weight of the asphalt bucket up to the full thousand pounds. At this point, light-sensitive device 88 once again becomes illuminated, energizing relay 102 and closing contacts 102–A and 102–B.

While the above description assumes that both fast and slow stone and sand gates 28 and 29 and 30, 31, respectively, are operated whether the light-sensitive devices 70 and 72 are stationarily positioned or are mounted as shown in FIG. 10, the control afforded by the FIG. 10 mounting makes it possible to use but one gate for dispensing stone and another gate for feeding sand. In this case, the switches 144 and 140 would simply be left unconnected and the light-sensitive devices 70, 72 would control the respective fast gates 28, 30.

The cycle now repeats itself as many times as desired, for example seven more times in the example described. At the end of the eighth cycle, the closing of batch counter advancing switch 148 causes the switch arm of batch counter 154 to step onto a contact which is not connected to the stop switch 216. This breaks the circuit between the stop switch 216 and the batch counter selector switch 158, and thus deprives motor relay 218 of current. Motor relay 218 consequently drops out, contacts 224 and 226 open and motor 112 stops. The fully loaded truck can now be driven away, and when the next truck is placed in position underneath the pug mill, the machinery can be restarted by pushing the batch counter reset button 160 and then the start switch 212. The batch counter resetting function and the starting function could of course be combined in a single button if desired. If the second truck is one which will hold only five batches of road surfacing material, the machine can quickly be adjusted to discharge only five batches by moving batch counter selector switch 158 to its other position, in which it connects batch counter 156 instead of 154 into the circuit of motor relay 218. It will be readily seen that batch counter 156 steps onto a dead contact after only five batches, thus stopping the machine. Of course, other amounts may be set on the batch counters, or other types of batch counters may be used for the same purpose.

Supposing now that a malfunction of the device occurs, resulting in the discharge of only eight hundred pounds of sand instead of the desired one thousand, the following will happen: light-sensitive device 72 will not be illuminated at the end of the sand discharge because the slot 76 in masking plate 64 is not where it should be. Consequently, contacts 106-A are not closed at the time that sand check switch 124 opens. This causes a break in the circuit at the sand check section 124, 106-A, and motor relay 218 drops out, stopping the machine. A suitable alarm system (not shown) may be provided in any well-known manner to advise the operator of this condition, whereupon the operator can examine the position of the pointer 60 of aggregate scale 36. From this, the operator can determine that an underweight condition of sand has occurred. The operator thereupon sets switch 211 to its "Manual" position (upper position in FIGURE 7), and pushes the push button 210 associated with sand gate 31, which causes sand gate 31 to open and discharge more sand into hopper 34. When the operator observes that the correct weight of sand has been reached, he releases the push buton 210 and presses the start button 212. The deficiency having been corrected, the relay contacts 106-A should now be closed so as to permit the machine to continue its cycle. If, instead of an underweight condition, an overweight condition had occurred, the operator would have to determine the seriousness of the condition and decide on the appropriate action to be taken. If the operator decides that the batch would still be usable, he may continue the automatic operation of the machine by simultaneously closing the checking circuit bypass switch 208 and pressing the start button 212. As soon as the timer has advanced to the point where it recloses sand check switch 124, the machinery will continue the cycle on its own. If, on the other hand, the operator decides that the batch is ruined, he can make appropriate provisions to divert the defective batch when it is discharged from the pug mill 40. If, at any time, the operator wishes to stop the mechanism independently of any automatic function, he need merely press the stop button 216 momentarily, as this will cause the motor relay 218 to drop out in the same manner as if a failure had occurred in the mechanism.

Alternative Embodiment

Figure 5:
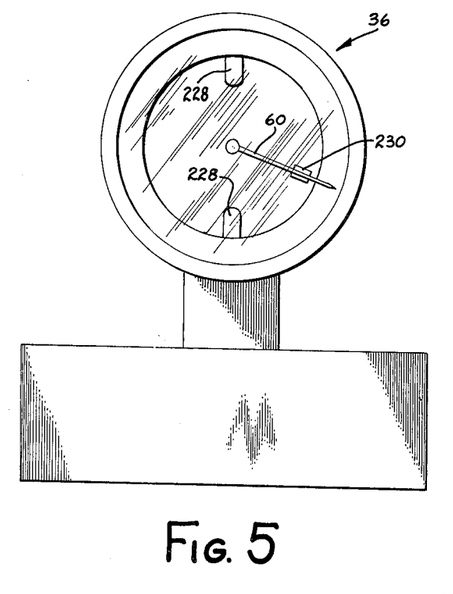
FIGURE 5 is a front elevation of another type of scale which can be used with this invention.
Figure 6:
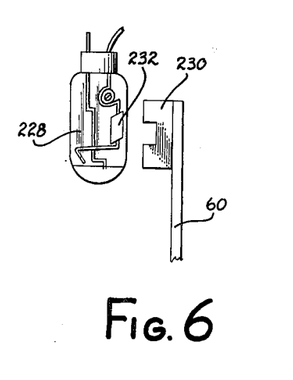
FIGURE 6 is a detail cross section showing a portion of the operating mechanism of the scale of FIGURE 5.

FIGURES 5 and 6 show an alternative embodiment of the invention in which the photocells and masking plate have been replaced by magnetic mercury switches which can be used to directly energize the relays 98 and 102 through 110 when a magnetized plate 230 mounted on pointer 60 sweeps past the magnetically sensitive element 232 of the mercury switch 228. This arrangement is somewhat cheaper than the embodiment using light-sensitive devices, but it lends itself only to those applications where the material discharge rate is slow enough so that the magnetized plate 230 on pointer 260 is not likely to travel out of the area of sensitivity of the magnetically sensitive element 232 after the materials discharge gate associated therewith has been closed.

In summary, an important aspect of the present invention can be conveniently understood by focusing attention on the control exhibited by the scale 36 and the timer of FIG. 8 on the proportioning of stone and sand from the bins 20 and 22 into the receptacle or hopper 34. So viewed, the timer may be said to operate through a four-step cycle when energized. The first step is operation of the switch 142 to feed stone from the bin 20 into the hopper 24 by energizing the appropriate selectively operable dispensing device or gate 29. The second timer step operates the switch 126 to check the weight of stone in the hopper 24; the scale controlled light-sensitive device 70 having interrupted operation of the gate 29.

The third timer step operates the switch 138 to feed sand into the hopper 24, and the fourth timer step operates the switch 124 to check the total weight of the stone and sand in the hopper. The scale controlled light-sensitive device 72, of course, interrupts operation of the sand dispensing gate 31 between the third and fourth timer steps.

It will be apparent that the above novel concept is not altered by continuing the timer cycle through further steps to add additional ingredients and check the new weights. However, a fifth step of the cycle followed by the timer of FIG. 8 is worthy of particular mention and that is the step in which the switch 128 is operated to check the hopper weight when it is supposed to be empty prior to preparing a new batch of materials.

At each of the above checking steps, means including the parallel circuits of switches 126, 124 and 128 and contacts 108-A, 106-A and 110-A, respectively, are effective to interrupt the cycle of the timer unless the weight of the contents of the hopper 24 then equals the desired predetermined values. So long as the timer cycle continues, the proportion of the materials mixed by the control remains reliably accurate.

Inherently, the scale responsive light-sensitive devices 68, 70, 72, 74, 86 and 88 will be actuated throughout a short range of hopper weight, rather than at a single precise value, as the slot 76 acts to swing the light beam across the devices. A similar range of actuation will be obtained when using the scale-responsive mercury switches 228. It is therefore proper to think of the above described control as being effective to cut off each dispensing gate as soon as a predetermined weight range is reached, allowing a few seconds to let the scale and falling materials settle, and then checking to make sure that the hopper weight is still in the desired range.

These ranges are, of course, quite limited when the light sensitive devices are stationarily positioned and thus it is desirable to use this arrangement only to control slow feed dispensing devices like the slow gates 29, 31 where there is little change in the hopper weight due to "free-fall"; i.e., the material already in the air at the time the dispensing gate is closed.

In effect, a greater range at each predetermined weight is obtained by using the arrangement of FIG. 10 to mount the light sensitive devices 70, 72 and 88 and, by so doing, dispensing devices having a greater lag or "free-fall" can be accurately controlled. By properly positioning the light-sensitive devices, the upper end of these increased weight ranges can be made to just embrace the exact predetermined weights desired. In this way, the scale 37 becomes effective to interrupt the dispensing operation as the weight of the hopper contents approaches the desired value, while the later checking operation insures that the upper range has been reached.

Actually, of course, the FIG. 10, two-position mounting for the device 70, 72 and 88 is more accurately than simply providing wide range scale sensing devices since two spaced predetermined weight ranges are sensed and a weight falling between them will interrupt operation of the timer cycle and not result in a proportioning error. The effect of the FIG. 10 mounting for the devices 70, 72 and 88 corresponds to having two scale sensing devices for controlling the addition of each ingredient, one to cut off the dispensing device as the desired weight is approached and a second to determine that the desired weight has been reached.

It will be seen from the foregoing description that this invention provides a highly efficient materials mixing device with practically foolproof automatic safeguards against the production of batches of materials containing ingredients in the wrong proportions. Obviously, many modifications of this invention are possible to adapt the mechanism described herein to the requirements of materials mixing machinery in other fields, such as the chemical industry, pharmaceutical industry, concrete industry, or the like. I therefore do not desire to be limited by the description of the illustrative embodiment set out above, but only by the scope of the following claims.

I claim:

1. In an automatic dosing machine, a source of material; weighing means; valve means for controlling the flow of material from said material source to said weighing means; said weighing means comprising: a material receptacle; a movable member connected to said material receptacle so as to move in accordance with the weight of said material in said receptacle; signal-producing means located adjacent said movable member, said signal-producing means being arranged to become energized when said movable member reaches a predetermined position; means for moving said signal-producing means from a first to a second attitude in response to its first energization, said movement of said signal-producing means being such that said movable member again causes energization of said signal-producing means when the lead weight of said material is added to the weight at which said first energization takes place; means actuated by said signal-producing means for closing said valve means immediately upon occurrence of said first energization; and means operated at a time at which said signal-producing means should be re-energized for checking whether or not said signal-producing means is then energized.

2. In an automatic dosing machine, a source of material; weighing means; valve means for controlling the flow of material from said material source to said weighing means; said weighing means comprising: a material receptacle; a movable member connected to said material receptacle so as to move in accordance with the weight of said material in said receptacle; photoelectric means located adjacent said movable member, said photoelectric means being arranged to become illuminated when said movable member reaches a predetermined position; means for moving said photoelectric means from a first to a second attitude in response to its first illumination, said movement of said photoelectric means being such that said movable member again causes illumination of said photoelectric means when the lead weight of said material is added to the weight at which said first illumination takes place; means actuated by said photoelectric means for closing said valve means immediately upon occurrence of said first illumination; and means operated at a time at which said photoelectric means should be re-illuminated for checking whether or not said photoelectric means is then illuminated, any further movement of said movable member returning said photoelectric means to its original attitude.

3. In an automatic dosing machine, a source of material; weighing means; valve means for controlling the flow of material from said material source to said weighing means; said weighing means comprising: a material receptacle; a movable member connected to said material receptacle so as to move in accordance with the weight of said material in said receptacle; photoelectric means located adjacent said movable member, said photoelectric means being arranged to become illuminated when said movable member reaches a predetermined position; means for moving said photoelectric means from a first to a second attitude in response to its first illumination, said movement of said photoelectric means being such that said movable member again causes illumination of said photoelectric means when the lead weight of said material is added to the weight at which said first illumination takes place; means actuated by said photoelectric means for closing said valve means immediately upon occurrence of said first illumination; means operated at a time at which said photoelectric means should be re-illuminated for checking whether or not said photoelectric means is then illuminated, cessation of said illumination returning said photoelectric means to its original position; and means for preventing said return of said photoelectric means for a predetermined time following cessation of said illumination.

4. Mechanism for automatically stopping a mixing machine after preparation of a predetermined number of batches and also in the event of a malfunctioning, comprising: an electrical series circuit comprising a plurality of electrical paths connected in series with each other, each path comprising a pair of switch means connected in parallel; means for closing one of said pair of switch means in each of said paths if the device functions correctly; means for momentarily opening the other of said switch means in each of said paths at the time when said first switch means are closed by proper functioning of the device; a step switch connected in said electrical circuit and so arranged so as to break said electrical circuit after a predetermined number of steps; means for stepping said step switch each time a batch is prepared; means for resetting said step switch; and means for stopping said machine when said series electrical circuit is broken.

5. An automatic mixing device comprising: means for successively dispensing a plurality of ingredients into weighing means; timed means for opening said dispensing means; means controlled by said weighing means for closing said dispensing means; and checking means synchronized with said timing means for checking the weight of said ingredients following each dispensing operation and stopping said device if said weight is not within predetermined limits.

6. An automatic mixing device comprising: means for successively dispensing a plurality of ingredients into weighing means; timed means for opening said dispensing means; means controlled by said weighing means for closing said dispensing means; checking means synchronized with said timing means for checking the weight of said ingredients following each dispensing operation and stopping said device if said weight is not within predetermined limits; and manually operable means for opening any one of said dispensing means independently of the operation of said timing and checking means.

7. An automatic mixing device comprising: means for successively dispensing a plurality of ingredients into weighing means; timed means for opening said dispensing means; means controlled by said weighing means for closing said dispensing means; checking means synchronized with said timing means for checking the weight of said ingredients following each dispensing operation and stopping said device if said weight is not within predetermined limits, said last-named means including an electrical series circuit comprising a timing motor for said timed means and a plurality of electrical paths connected in series with each other, each path comprising a pair of switch means connected in parallel; means for closing one of said pair of switch means in each of said paths if the device functions correctly; means for momentarily opening the other of said switch means in each of said paths at the time when said first switch means are closed by proper functioning of the device; a step switch connected in said electrical circuit and so arranged so as to break said electrical circuit after a predetermined number of steps; means for stepping said step switch each time a batch is prepared; means for resetting said step switch; and means for stopping said machine when said series electrical circuit is broken.

8. A dosing machine comprising: a plurality of ingredient supply means; means for successively dispensing ingredients from said supply means into a weighing container; scale means connected to said container for actuation thereby, said scale means comprising a light source, baffle means movable with respect to said light source in accordance with the weight of material in said container, a photoelectric sensing device movable between two positions, and means for moving said photoelectric sensing device from one position to the other in response to energization of said photoelectric sensing device; means associated with said sensing device to close said ingredient discharge means following a first energization of said sensing device, and means for stopping said ingredient dispensing operation unless a second energization of said sensing device occurs within a predetermined time interval, said baffle means being arranged to cause said photoelectric sensing device to be illuminated in its first position when said container reaches a predetermined weight, and in its second position when the lead weight of the ingredient being dispensed is added to said predetermined weight.

9. A dosing machine comprising: a plurality of ingredient supply means; means for successively dispensing ingredients from said supply means into a weighing container; scale means connected to said container for actuation thereby, said scale means comprising a signal source, signal imparting means movable with respect to said signal source in accordance with the weight of material in said container, a sensing device movable between two positions, and means for moving said sensing device from one position to the other in response to energization of said sensing device; means associated with said sensing device to close said ingredient discharge means following a first energization of said sensing device, and means for stopping said ingredient dispensing operation unless a second energization of said sensing device occurs within a predetermined time interval, said signal imparting means being arranged to cause said sensing device to be energized in its first position when said container reaches a predetermined weight, and in its second position when the said weight of the ingredient being dispensed is added to said predetermined weight.

10. A control for a materials proportioning apparatus having two selectively operable dispensing devices each arranged for feeding material into a common receptacle, comprising the combination of a scale coupled to said receptacle and responsive to the weight of the contents thereof, a timer operable through a four-step cycle when energized, means controlled by said timer at its first step for operating the first of said dispensing devices to feed material into said receptacle, means controlled by said scale for interrupting operation of said first dispensing device when the weight of the contents of the receptacle approaches a first predetermined value, means controlled by said scale and timer at its second step for interrupting the timer cycle unless the weight of the receptacle contents equals said first predetermined value, means controlled by said timer at its third step for operating the second of said dispensing devices to feed material into said receptacle, means controlled by said scale for interrupting operation of said second dispensing device when the weight of the contents of the receptacle approaches a second predetermined value, and means controlled by said scale and said timer at its fourth step for interrupting the timer cycle unless the weight of the receptacle contents equals said second predetermined value.

11. A control for a materials proportioning apparatus having two selectively operable dispensing devices each arranged for feeding material into a common receptacle, comprising the combination of a scale coupled to said receptacle and responsive to the weight of the contents thereof, a timer operable through a five-step cycle when energized, means controlled by said scale and said timer at its first step for interrupting the timer cycle unless the weight of the receptacle contents is zero, means controlled by said timer at its second step for operating the first of said dispensing devices to feed material into said receptacle, means controlled by said scale for interrupting operation of said first dispensing device when the weight of the contents of the receptacle reaches a first predetermined value, means controlled by said scale and timer at its third step for interrupting the timer cycle unless the weight of the receptacle contents equals said first predetermined value, means controlled by said timer at its fourth step for operating the second of said dispensing devices to feed material into said receptacle, means controlled by said scale for interrupting operation of said second dispensing device when the weight of the contents of the receptacle reaches a second predetermined value, and means controlled by said scale and said timer at its fifth step for interrupting the timer cycle unless the weight of the receptacle contents equals said second predetermined value.

12. A control for a materials proportioning apparatus having two selectively operable dispensing devices each arranged for feeding material into a common receptacle, comprising the combination of a scale coupled to said receptacle and responsive to the weight of the contents thereof, a first means operated by said scale when the weight of the contents of the receptacle falls within a first predetermined range, a second means operated by said scale when the weight of the contents of the receptacle falls within a second predetermined range, a timer operable through a cycle when energized, mechanism controlled by said timer for initiating operation of said dispensing device in predetermined sequence, said first means being effective, when operated, to interrupt operation of one of said dispensing devices, said second means being effective, when operated, to interrupt the operation of the other of said dispensing devices, and a checking circuit including elements controlled by said first means, said second means, and said timer for interrupting said timer cycle unless (1) said first means is operated following operation of said first dispensing device and (2) said second means is operated following operation of said second dispensing device.

13. A control for a materials proportioning apparatus having two selectively operable dispensing devices each arranged for feeding material into a common receptacle, comprising the combination of a scale coupled to said receptacle and responsive to the weight of the contents thereof, a first means operated by said scale when the receptacle is empty, a second means operated by said scale when the weight of the contents of the receptacle falls within a first predetermined range, a third means operated by said scale when the weight of the contents of the receptacle falls within a second predetermined range, a timer operable through a cycle when energized, mechanism controlled by said timer for discharging the contents of said receptacle and initiating operation of said dispensing devices in predetermined sequence, said second means being effective, when operated, to interrupt operation of one of said dispensing devices, said third means being effective, when operated, to interrupt the operation of the other of said dispensing devices, and a checking circuit including elements controlled by said first, second and third means and said timer for interrupting said timer cycle unless (1) said first means is operated following the discharge of the contents of said receptacle, (2) said second means is operated following operation of said first dispensing device and (3) said third means is operated following operation of said second dispensing device.

References Cited in the file of this patent

UNITED STATES PATENTS

| | | |
|---|---|---|
| 2,022,659 | Fisher | Dec. 3, 1935 |
| 2,232,404 | Pratt | Feb. 18, 1941 |
| 2,431,058 | Manning | Nov. 18, 1947 |
| 2,614,786 | Caron | Oct. 21, 1952 |
| 2,625,301 | Saxe | Jan. 13, 1953 |
| 2,664,260 | Saxe | Dec. 29, 1953 |
| 2,982,368 | McMahon | May 2, 1961 |